United States Patent [19]

Marcotullio et al.

[11] Patent Number: 5,595,596
[45] Date of Patent: Jan. 21, 1997

[54] CEMENT COMPOSITION AND ITS USE FOR THE PREPARATION OF LIGHTWEIGHT CONCRETES

[75] Inventors: Armando Marcotullio, S. Donato Milanese; Massimo Santori, Varese, both of Italy

[73] Assignee: Eniricerche S.p.A., Milan, Italy

[21] Appl. No.: 580,660

[22] Filed: Dec. 29, 1995

[30] Foreign Application Priority Data

Jan. 23, 1995 [IT] Italy .................. MI95A0101

[51] Int. Cl.$^6$ .................. C04B 38/10; C04B 24/02
[52] U.S. Cl. .................. 106/677; 106/678; 106/724; 106/725; 106/728; 106/802; 106/808; 106/809; 106/810; 106/815; 106/820; 106/823
[58] Field of Search .................. 106/677, 678, 106/724, 725, 728, 815, 820, 823, 802, 808, 809, 810

[56] References Cited

U.S. PATENT DOCUMENTS

| | | | |
|---|---|---|---|
| 3,821,985 | 7/1974 | George | 166/293 |
| 4,156,615 | 5/1979 | Cukier | 156/39 |
| 4,618,370 | 10/1986 | Green et al. | 156/39 |
| 4,941,536 | 7/1990 | Brothers et al. | 106/803 |
| 5,281,270 | 1/1994 | Totten et al. | 106/687 |
| 5,466,393 | 11/1995 | Diez et al. | 106/680 |

FOREIGN PATENT DOCUMENTS

| | | |
|---|---|---|
| 336749 | 10/1989 | European Pat. Off. . |
| 582367 | 2/1994 | European Pat. Off. . |
| 49-11845 | 3/1974 | Japan .................. 106/677 |

OTHER PUBLICATIONS

WPAT, AN 83-829529/48, JP-A-58 179 218, Oct. 20, 1983.
WPAT, AN 83-49092K/20, WO-A-83 01615, May 11, 1983.
WPAT, AN 92-102176, JP-A-04 046 149, Feb. 17, 1992.
WPAT, AN 87-034118/05, JP-A-61 291 693, Dec. 22, 1986.
WPAT, AN 94-265351/33, EP-A-611734, Aug. 24, 1994.
Kirk–Othmer, "Encyclopedia of Chemical Technology", Third Edition, vol. 1, pp. 747–748 (1978) No month.
Chemical Abstract No. 106:89319, abstract of Japanese Patent Specification No. 61-191547, 26 Aug. 1986.

*Primary Examiner*—Anthony Green
*Attorney, Agent, or Firm*—Oblon, Spivak, McClelland, Maier & Neustadt, P.C.

[57] ABSTRACT

The present invention relates to a cement composition containing water, hydraulic cement, inert products and a foaming agent obtained by reacting ethylene oxide with a substrate deriving from the production of synthetic alcohols by the oxosynthesis of normal-olefins, sulfating the ethoxylate compound thus obtained with sulfuric anhydride and neutralizing the sulfated acid product with a base of an alkaline, earth-alkaline metal or ammonia.

The cement composition can optionally contain conventional additives such as stabilizers, set retarders or accelerators and disperding agents suitable for lowering the viscosity of the composition.

This cement composition has improved processability characteristics and enables the production of lightweight concretes having greater mechanical resistance and durability and lower thermal conductivity particularly appropriate for the building industry.

20 Claims, No Drawings

CEMENT COMPOSITION AND ITS USE FOR THE PREPARATION OF LIGHTWEIGHT CONCRETES

The present invention relates to a composition of cement containing a foaming agent and its use for the preparation of lightweight concretes.

Low density concretes, also known as lightweight or cellular concretes, consisting of a cement matrix characterized by pores, which for the most part are not intercommunicating, having a spherical or spheroidal shape and with dimensions of between 1 and 10 nm, are well-known in the art. These concretes have, with respect to normal concretes, a lower thermal conductivity, good fire-resistance, unalterability over a period of time and a compression resistance of between 1 and 200 Kg/cm$^2$. They are preferably used in the building industry for improving the thermal insulation of components exposed to the atmosphere and for obtaining slopes and/or very light underfloors which remain stable over long periods of time.

Lightweight concretes are typically used for the preparation of insulating panels, the filling of laminar spaces, the filling of deep cavities and spaces, antivibrating foundations, prefabricated elements, etc.

Lightweight concretes can be prepared by introducing compressed air, an aerating additive or a dense preformed foam into the cement mortar, before or during processing.

In the present invention the term aerating additive or foaming agent means a substance capable of forming microbubbles of gas in the cement composition.

Examples of these additives are ionic, anionic and cationic surface-active agents, protein hydrolyzates or reactive inorganic chemical compounds, of aluminia dust type, which generate bubbles of gas in the presence of humid cement.

At present, formulations essentially based on anionic surface-active agents of the group of alkyl-ethoxylated sulfates or mixtures of peptides and peptones, are commercially available.

The foaming additives of the known art however are costly and the process for their preparation is complex and onerous. In addition, these foaming additives, especially ionic surface-active agents, are not very resistant to a cement environment which, owing to the high concentration of ions and electrically charged particles, tends to precipitate these additives with a consequent weakening and destruction of the foam structure.

The necessity has therefore been felt for having more economical foaming additives which are easier to prepare. In addition, there is still the necessity in the art of having additives which are capable of further improving the characteristics of cement compositions and concretes obtained with these compositions.

It has now been found that these requirements can be satisfied with the cement compositions of the present invention which contain hydraulic cement, inert products, water and a foaming additive, these compositions being characterized in that the foaming additive is obtained by reacting ethylene oxide with a substrate deriving from the production of synthetic alcohols by the oxosynthesis of normal-olefins, sulfating the ethoxylated compound thus obtained with sulfuric anhydride and neutralizing the resulting sulfated acid product with a base of an alkaline, earth-alkaline metal or ammonia.

The substrate used for the preparation of the additive according to the present invention represents the waste fraction (residue) of the processes for the production of synthetic alcohols by the oxosynthesis of normal-olefins. This fraction has a content of $C_{11}$–$C_{20}$ alcohols of between 20 and 40% by weight and between 0 and 15% by weight of light products.

The substrate used in the ethoxylation reaction conveniently has as low a water content as possible and, in any case, less than 100 ppm.

More particularly, the foaming additive is obtained:

(i) by putting ethylene oxide in contact with a substrate deriving from the production of synthetic alcohols by the oxosynthesis of normal-olefins, with a weight ratio between them of between 0.5/1 and 2.0/1, preferably between 1.0/1 and 1.5/1, in the presence of a basic catalyst, such as for example KOH or NaOH, in a weight percentage with respect to the total charge (ethylene oxide plus substrate) of between 0.05 and 1.0%, preferably between 0.1 and 0.5%, and the operating temperatures are between 120° and 160° C., under pressure and for a period of time necessary for obtaining the desired degree of ethoxylation;

(ii) by reacting, in continuous or batchwise, the ethoxylated compound obtained in step (i) with sulfuric anhydride, liquid or gaseous, in a stoichiometric quantity to obtain a unitary molar ratio;

(iii) by neutralizing the sulfation products, after cooling, with a base of an alkaline, earth-alkaline metal or with ammonia; and finally (iv) by recovering the additive from the neutralization products.

The sulfation reaction of step (ii) can be carried out with the conventional methods using one of the following processes:

batchwise, with a batch reactor equipped with a mechanical stirrer and suitable for processing under pressure, using $SO_2$ as solvent; or in continuous, with a fine film reactor, feeding the $SO_3$ diluted to 5–10% in air.

In both processes the sulfation temperature of the ethoxylated compound is maintained at between 20° and 50° C.

Operating according to the first procedure, the $SO_3$ is fed in a liquid phase in times of between 10 and 30 minutes, cooling the reactor contemporaneously by piping-water circulation in suitable coils installed in the reactor itself. After sending the $SO_3$ the reaction is left to finish for about 15–30 minutes at a temperature of 30°–40° C. and, subsequently, the $SO_2$ is degassed and the gas is sent to a suitable cooled container containing a solution of NaOH at 20%. The $SO_2$ can possibly be recovered by condensation and recycled to the subsequent reactions.

The organic acid obtained is then subjected to hydrolysis and subsequently neutralized with a base of an alkaline, earth-alkaline metal or with ammonia.

When the second procedure is used, the organic acid leaving the reactor, after air flashes for the dilution of the $SO_3$, is directly hydrolized and neutralized as described above.

At the end of the neutralization phase, the product can be separated from the aqueous solution, but preferably raw reaction product diluted in water is used.

The foaming additives are used in the compositions of the present invention in quantities of between 0.01 and 1.0% by weight, preferably between 0.05 and 0.50%, with respect to the cement, the percentage being calculated on the active part.

The compositions of the present invention have a weight ratio water/cement of between 0.4/1 and 0.7/1, preferably between 0.45/1 and 0.55/1, and a ratio inert products/cement of between 1/1 and 3/1, preferably 2/1.

Hydraulic cement or cement, according to the present invention, refers to cements known as "Portland cements" like the normal Portland cement or the fast-hardening Portland cement and sand is used as the inert product.

In a preferred form of embodiment the compositions of cement of the present invention can be obtained by mixing:

a) a preformed foam obtained starting from an aqueous solution of the foaming additive at a concentration of between 0.5 and 5.0%, preferably between 1.0 and 3.0% by weight (calculated on the active part of the product) with respect to the water and optionally a stabilizer; and b) a cement slurry comprising water, hydraulic cement and inert products, with a weight ratio water/cement of between 0.25/1 and 0.50/1, and inert products/cement of between 1/1 and 3/1, preferably 2/1.

Stabilizing agents suitable for the purposes of the present invention, can be selected from polyethyleneoxide (PEO) with a molecular weight of between 1,000 and 100,000 and polyalcohols with a number of carbon atoms of between 10 and 18.

PEO (100,000 M.W.) is preferably used in a quantity of between 0.1 and 1.0%, preferably between 0.2 and 0.3%, by weight with respect to the water.

In accordance with the present invention, the foam (a) can be prepared by using equipment selected from what is commercially available for example an SG70 Aerator of Addiment. The water, foaming additive and optionally a stabilizer are conveniently introduced into this apparatus in the concentrations indicated above, and the resulting solution is maintained, under stirring, at room temperature (20°–30° C.) for the time necessary for obtaining a dense, homogeneous foam. The foam can be prepared industrially under air pressure. The foam thus obtained has air bubbles with dimensions of between 10 and 100 millimicrons and a good stability.

After introducing the foam into the cement slurry, the resulting composition is appropriately mixed to obtain a homogeneous mixture without causing however a collapse, which would be undesirable, in the level of the foam. The quantity of foam introduced into the cement slurry depends on the density required for the concrete and on the characteristics of the foam itself. Such quantities of foam are used however that the final ratios between water, foaming additive and cement are within the range of those specified above.

According to a further form of embodiment of the present invention, the foaming additive and, optionally, the stabilizer can be introduced directly into a slurry of cement and inert products and mixed, under pressure or at atmospheric pressure, until a homogeneous composition of cement is obtained with the desired characteristics.

When used, the stabilizer is normally present in quantities of between 0.01 and 1.0%, preferably between 0.015 and 0.5% by weight with respect to the cement.

The cement composition of the present invention can optionally contain other conventional additives, such as set retarders or accelerators and dispersers suitable for lowering the viscosity of the cement composition.

The set retarders can be selected from lignosulfonates, borates, organic acids, such as gluconic acid and citric acid and copolymers of 2-acrylamido-2-methyl propane sulfonic acid with acrylic acid. These retarders, when used, are normally present in a quantity of between 0.1 and 10 parts by weight per 100 parts by weight of cement.

Set accelerators can be selected from inorganic salts and hydrocarboxylic acids and, when used, are normally present in a quantity of between 0.1 and 10 parts by weight per 100 parts by weight of cement.

Dispersers which are suitable for the purpose are naphthalene sulfonate condensed with formaldehyde and similar products. These agents, if used, are generally present in the compositions in a quantity of about 0.5–3 parts by weight per 100 parts by weight of cement.

The foaming additive of the present invention is economical owing to the raw materials used and is obtained with a simple and convenient process. This additive when used in small concentrations gives the compositions of cement a better processability with self-compacting and self-leveling characteristics. It has also been found that the use of these additives causes a reduction in the ratio water/cement increasing, with the same processability and density, the mechanical resistance of the lightweight concretes obtained from these compositions.

The lightweight concretes obtained by the aging of the cement composition of the present invention have good mechanical and durability characteristics. Tests for evaluating the compression resistance (UNI 6132) have given better results not only in terms of quantity, but also quality; the concrete samples in fact, have a different fracturing feature and which is in any case better than the comparative sample.

In addition, these lightweight concretes, compared to concretes prepared with commercial additives, have a reduced thermal conductivity (UNI 7891) and a lower dimensional variation (UNI 6687).

The aging of lightweight concretes can be carried out at room temperature and atmospheric pressure, or by thermal treatment following the conventional techniques or by the addition of accelerating additives.

In the experimental examples below the following foaming additives are used:

Additive A:
obtained by reacting ethylene oxide with the substrate operating with a weight ratio between them of 1/1, sulfating the ethoxylated product with liquid sulfuric anhydride with $SO_2$ as solvent and neutralizing the sulfated acid product thus obtained with sodium hydroxide.

The molecular weight of the resulting product at 100% of active part is between 450 and 550.

The aqueous solution of this additive at 41% by weight of active part, with a concentration similar to that of commercial products, has:

| | |
|---|---|
| viscosity (UNI 8490/3A) | 112 mPA · s |
| pH (UNI 8490/15) | 8.5 |

The aqueous solution of this additive at 1% by weight of active part stabilized with 0.25% by weight of PEO (MW 100,000) has the following characteristics:

| | |
|---|---|
| viscosity | 1.1 mPA · s |
| surface-active capacity | 32 dyne/cm |
| foaming capacity ($t_{1/2}$) | 30 minutes |

Additive B:
obtained as described above using a ratio ethylene oxide:substrate equal to 2:1.

The molecular weight of the resulting product at 100% of active part is between 620 and 770.

The aqueous solution of this additive at 40% by weight of active part, has:

| | |
|---|---|
| viscosity (UNI 8490/3A) | 123 mPA · s |
| pH (UNI 8490/15) | 8.4 |

The aqueous solution of this additive at 1% by weight of active part stabilized with 0.25% by weight of PEO (MW 100,000) has the following characteristics:

| | |
|---|---|
| viscosity | 1.2 mPA · s |
| surface-active capacity | 34 dyne/cm |
| foaming capacity ($t_{1/2}$) | 15 minutes |

Additive C:

commercial formulation comprising 40% by weight of active part.

The substrate used for the preparation of the foaming additives (A) and (B) have the following composition:

| | |
|---|---|
| $C_{11}$–$C_{20}$ alcohols | 20–40% by weight |
| light products | 0–15% |
| ethers | 5–16% |
| ether-alcohol | 6–23% |
| alcohol dimer | 9–10% |
| ester | 15% |
| acetals and/or aldols | 9–10% |
| other products | 9–11% |
| acidity: $mg_{KOH}/g$ | 0.1–1.7 |
| bromine index: | 500–3100 |
| saponification nr.: $mg_{KOH}/g$ | 2–2.5 |
| carbonyl nr.: $mg_{KOH}/g$ | 9–35 |
| peroxides: ppm | 5–1000 |

The following experimental examples provide a better illustration of the present invention without limiting its scope.

EXAMPLE 1

The preparation of the foam is carried out starting from an aqueous solution at 1% by weight of additive calculated on the active part (A and B) and 0.25% by weight of stabilizer PEO (MW 100,000).

The additive, water and the stabilizer are introduced into a glass container, with a capacity of 2 liters, in the quantities indicated above. The solution is maintained under mechanical stirring with an electric mixer, at room temperature for about 2 minutes. A compact foam is obtained with air bubbles having dimensions of about 10–100 nm.

300 g of Portland 425 cement, 100 g of water and 600 g of normal sand from Torre del Lago (according to M.D. 3/6/1968) so that a ratio water/cement of 0.33 and a ratio sand/cement of 2/1 are obtained, are contemporaneously introduced into a 2 liter container.

The resulting slurry is mixed manually until complete absorption of the water and 40 g of foam (39.5 g of water) are then added. The cement composition has a weight ratio water/cement of 0.465 and a quantity of additive of 0.13% with respect to the cement.

With the cement mortars thus obtained small cubes with sides of 5 cm are prepared and the density under humidity and mechanical resistance (M.R.) to compression after 28 days of aging in a humid environment, are determined.

For comparative purposes the test is repeated with equal quantities of a commercial additive (additive C) containing 40% by weight of active part.

The results are shown in table 1.

TABLE 1

| Composition | density (g/cm$^3$) | M.R. Kg/cm$^2$ |
|---|---|---|
| additive (A) | 1.63 | 84 |
| additive (B) | 1.61 | 78 |
| additive (C) | 1.60 | 68 |

EXAMPLE 2

The same procedure is carried out as in example 1, using compositions of cement with a weight ratio water/cement equal to 0.5/1. As a control, cement mortars are used without the foaming additive (Blank). Tests are carried out on fresh pastes of cement mortars to evaluate the fluidity (UNI7044) and reduction in the quantity of water (UNI 8145).

The results are shown in table 2.

TABLE 2

| Composition | A/C | S/C | density g/cm$^3$ | Fluidity |
|---|---|---|---|---|
| additive (A) | 0.50 | 2 | 1.3 | 110 |
| additive (C) | 0.50 | 2 | 1.3 | 60 |
| Blank | 0.50 | 2 | 2.3 | 50 |
| Blank* | 0.50 | 2 | 2.3 | 90 |

The above data show that, with the same density, the cement paste obtained using additive A has a greater fluidity than that obtained using additive C. In addition, from a comparison with the cement paste prepared without the foaming additive (Blank), it can be observed that to obtain a fluidity of more or less the same entity, it is necessary to increase the water content by about 12% by weight (Blank*).

The above data indicate that, with the same ratio water/cement, the additives of the present invention allow better values of fluidity and consequently processability of the cement paste to be obtained with respect to the comparative additive.

EXAMPLE 3

A foaming machine (Aerator SG70 of Addiment) is used to prepare a foam starting from a concentrated aqueous solution containing 500 g of additive A (15% of active part) and 24 g of PEO (4.6%).

Contemporaneously, first 20 kg of sand from the river Po with a particle size of less than 2 mm in diameter and 3 Kg of water are charged into a paste mixer, followed, after brief mixing, by 10 Kg of Portland 425 cement. The subsequent addition of the cement prevents the formation of lumps. 15 l of foam (1660 g of water) are added to the cement mortar, maintained under stirring.

In this composition the consumption of the preformed mixture (additive A+PEO) proved to be 92 g. The weight ratio water/cement is 0.465/1 and the quantity of foaming additive (at 100% of active part) with respect to the cement is 0.13% by weight.

With the cement mortars thus obtained small 15 cm-sided cubes are prepared on which the density and mechanical compression resistance after 28 days of aging in a humid atmosphere, are determined.

The results are shown in table 3.

TABLE 3

| Composition | density (g/cm³) | R.M. Kg/cm² |
| --- | --- | --- |
| Additive (A) | 1.66 | 102.5 |
| Additive (B) | 1.55 | 72.2 |
| Additive (C) | 1.63 | 53.6 |

EXAMPLE 4

The same procedure is carried out as in example 3 using 1 Kg of foam prepared starting from an aqueous solution comprising 227 g of additive A (22% of active part) corresponding to 49.9 g of additive at 100%, 10 g of PEO and 770.5 g of water.

Small 15 cm-sided cubes are then prepared with the mortar pastes and the casting density and density after drying at 110° C. up until constant weight, are determined together with the compression resistance after 28 days of aging in a humid atmosphere. The results are shown in table 4.

TABLE 4

| composition | casting density | density after 28 days | R.M. |
| --- | --- | --- | --- |
| additive (A) | 1.42 g/cm³ | 1.24 g/cm³ | 50.3 Kg/cm² |
| additive (C) | 1.40 g/cm³ | 1.23 g/cm³ | 24.5 Kg/cm² |

EXAMPLE 5

Operating as in example 4, small cubes are prepared on which water absorption tests (UNI 7699) are carried out. The results are shown in table 5.

TABLE 5

| Additive | Dry density g/cm³ | Weight increases % | | | | | |
| --- | --- | --- | --- | --- | --- | --- | --- |
| | | Contact immersion | | | | Complete immersion | |
| | | 1 h | 3 h | 8 h | 24 h | 3 days | 7 days |
| A | 1.25 | +18.3 | +18.9 | +18.3 | +19.0 | +19.3 | +20.0 |
| C | 1.23 | +20.1 | +21.3 | +20.5 | +21.4 | +22.8 | +24.3 |

The results show that with the same density, the samples of concrete prepared with additive A have a lower water absorption than comparative sample (C).

EXAMPLE 6

The same procedure is carried out as in example 4, using cement pastes with a weight ratio water/cement of 0.4 and a quantity of additive equal to 0.5% with respect to the cement. The density and mechanical resistance to 7 and 28 days of aging are determined on the cubes prepared with these pastes.

The results are shown in table 6.

TABLE 6

| Additive | A/C ratio | Density g/cm³ | Mechanical resis. Kg/cm² | |
| --- | --- | --- | --- | --- |
| | | | 7 days | 28 days |
| A | 0.4 | 1.25 | 41.2 | 52.2 |
| C | 0.4 | 1.25 | 22.5 | 26.2 |

From the data shown in the table, it can be observed that with the same water/cement ratios and density, the concrete samples prepared with additive A have a compression resistance, both at 7 and 28 days of aging, which is about the double of that of the comparative sample; in addition the cubes of concrete subjected to the compression test have a fracturing which is qualitatively different and in any case better than the comparative sample.

EXAMPLE 7

Tests for the evaluation of the dimensional variation (UNI 6687) and thermal conductivity (UNI 7891) are carried out on 15 cm-sided cubes prepared as described in example 2.

The results are shown in table 7.

TABLE 7

| Additive | Dimensional variations (%) | | | | Conduc. |
| --- | --- | --- | --- | --- | --- |
| | 3 days | 7 days | 14 days | 28 days | W/mK |
| A | −0.0092 | −0.0101 | −0.0109 | −0.0160 | 12.54 |
| C | −0.0107 | −0.0213 | −0.0266 | −0.0297 | — |
| Blank | — | — | — | — | 77.70 |

On examining the results obtained, it can be seen that the samples of concrete lightened by using additive A have:

a dimensional variation at the end of the aging period (28 days) which is less than that determined for the comparative sample and an 80% reduction in the thermal conductivity with respect to that of a normal concrete (without the addition of a foaming additive).

We claim:

1. A cement composition comprising a hydraulic cement, water, inert products and a foaming additive, wherein the foaming additive is obtained by:
   (i) contacting ethylene oxide with a residue obtained in the production of synthetic alcohols by the oxosynthesis of normal-olefins, in a weight ratio of ethylene oxide to said residue of from 0.5/1 to 2.0/1, in the presence of a basic catalyst selected from KOH or NaOH in a weight percentage based on the total amount of ethylene oxide and residue of between 0.05 and 1.0% at a temperature between 120° and 160° C. and under pressure and for a period of time so as to obtain an ethoxylated product;
   (ii) reacting the ethoxylated product obtained in step (i) with liquid or gaseous sulfuric anhydride in a stoichiometric quantity to obtain a sulfation product;
   (iii) neutralizing the sulfation product of step (ii) with a base of an alkaline metal or of an alkaline earth metal, or with ammonia to obtain a neutralized product; and
   (iv) recovering said neutralized product as said foaming additive.

2. Cement composition according to claim 1, wherein the weight ratio ethylene oxide to said residue is between 1.0/1 and 1.5/1.

3. Cement composition according to claim 1, wherein the catalyst is present in an amount of between 0.1 and 0.5% by weight, based on the total amount of ethylene oxide and residue.

4. Cement composition according to claim 1, wherein step (ii) is carried out batchwise using sulfur dioxide as solvent.

5. Cement composition according to claim 1, wherein step (ii) is carried out continuously using sulfuric anhydride diluted to 5–10% by volume in air.

6. Cement composition according to claim 1, wherein the cement and water are present in a weight ratio of water/cement of between 0.4/1 and 0.7/1, the inert products and cement are present in a weight ratio of inert products/cement of between 1/1 and 3/1, and the foaming additive is present in an amount of between 0.01 and 1.0% by weight based on the cement.

7. Cement composition according to claim 6, wherein the weight ratio water/cement is from 0.45/1 to 0.5/1, the weight ratio of inert products/cement is from 1.5 to 2.5/1, and the concentration of the foaming additive is from 0.05 to 0.5% by weight based on the cement.

8. Cement composition according to claim 1, wherein the hydraulic cement is a Portland cement.

9. Cement composition according to claim 1, wherein the inert product is sand.

10. Cement composition according to claim 1, wherein the cement composition additionally contains a stabilizer, a set retarder, a set accelerator, a dispersing agent, or a mixture thereof.

11. Cement composition according to claim 10, wherein the stabilizer is a polyethylene oxide with a molecular weight of between 1,000 and 100,000 or a polyalcohol with a number of carbon atoms of between 10 and 18, and are present in an amount of between 0.01 and 1.0% by weight based on the cement.

12. Cement composition according to claim 11, wherein the stabilizer is polyethylene oxide and is present in an amount of from 0.015 to 0.5% by weight based on the cement.

13. Cement composition according to claim 10, wherein the set retarders are selected from lignosulfonates, borates, organic acids and copolymers of 2-acrylamido-2-methyl propanesulfonic acid with acrylic acid and are present in an amount of between 0.1 and 10 parts by weight for every 100 parts by weight of cement.

14. Cement composition according to claim 10, wherein the set accelerators are selected from inorganic salts or hydrocarboxylic acids and are present in an amount of between 0.1 and 10 parts by weight for every 100 parts by weight of cement.

15. Cement composition according to claim 10, wherein the dispersing agent is naphthalene sulfonate condensed with formaldehyde and is present in an amount of about 0.5–3 parts by weight per 100 parts by weight of cement.

16. Cement composition obtained by a process comprising mixing:
   (a) a foam having air bubbles with a dimension of between 10 and 100 millimicrons obtained from an aqueous solution of a foaming additive prepared as described in steps (i) to (iv) of claim 1, said additive being present at a concentration of between 0.5 and 5.0% by weight with respect to the water in said aqueous solution, and optionally a stabilizer selected from polyethylene oxides with a molecular weight of between 1,000 and 100,000 or polyalcohols with a number of carbon atoms of between 10 and 18, said stabilizer being present at a concentration of between 0.1 and 1.0% by weight with respect to the water in said aqueous solution; with
   (b) a cement slurry comprising water, hydraulic cement and inert products with a weight ratio water/cement of between 0.25/1 and 0.45/1, and inert products/cement of between 1/1 and 3/1; and
   wherein the weight ratio between foam (a) and the cement slurry (b) is selected to obtain a lightweight cement composition having a density of between 0.8 to 1.8 g/cm$^3$ and a mechanical resistance of between 20 and 170 kg/cm$^2$.

17. Cement composition according to claim 16, wherein in step (a) the stabilizer is present in an amount of from 0.2 to 0.3% by weight and the foaming additive is present in an amount of from 1.0 to 3.0% by weight.

18. Cement composition according to claim 16, additionally containing a set retarder, a set accelerator, a dispersing agent or a mixture thereof.

19. Cement composition according to claim 13, wherein said organic acids are gluconic acid or citric acid.

20. Cement composition according to claim 1, wherein said residue is of the following composition:

| | |
|---|---|
| $C_{11}$–$C_{20}$ alcohols | 20–40% by weight |
| light products | 0–15% |
| ethers | 5–16% |
| ether-alcohol | 6–23% |
| alcohol dimer | 9–10% |
| ester | 15% |
| acetals and/or aldols | 9–10% |
| other products | 9–11% |
| acidity: mg$_{KOH}$/g | 0.1–1.7 |
| bromine index: | 500–3,100 |
| saponification nr.: mg$_{KOH}$/g | 2–2.5 |
| carbonyl nr.: mg$_{KOH}$/g | 9–35 |
| peroxides: ppm | 5–1000. |

* * * * *